United States Patent
Takagi (10) Patent No.: US 10,246,011 B2
(45) Date of Patent: Apr. 2, 2019

(54) VEHICULAR LIGHTING DEVICE

(71) Applicant: Yazaki Corporation, Tokyo (JP)

(72) Inventor: Hiroyasu Takagi, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/966,618

(22) Filed: Apr. 30, 2018

(65) Prior Publication Data

US 2019/0031092 A1 Jan. 31, 2019

(30) Foreign Application Priority Data

Jul. 31, 2017 (JP) ................................. 2017-147412

(51) Int. Cl.
*B60Q 3/12* (2017.01)
*G08B 5/36* (2006.01)
*H05B 37/02* (2006.01)
*G10L 15/00* (2013.01)

(52) U.S. Cl.
CPC ................. *B60Q 3/12* (2017.02); *G08B 5/36* (2013.01); *H05B 37/0236* (2013.01); *B60K 2350/203* (2013.01); *B60K 2350/928* (2013.01); *G10L 15/00* (2013.01)

(58) Field of Classification Search
CPC combination set(s) only.
See application file for complete search history.

(56) References Cited

U.S. PATENT DOCUMENTS

| 7,210,829 B2 * | 5/2007 | Okazaki | B60Q 3/64 362/23.19 |
| 2006/0034092 A1 * | 2/2006 | Okazaki | B60Q 3/64 362/489 |

FOREIGN PATENT DOCUMENTS

| JP | 2002264724 A | * | 9/2002 | B60Q 3/68 |
| JP | 2010-285061 A | | 12/2010 | |
| JP | 2010285061 A | * | 12/2010 | |

* cited by examiner

*Primary Examiner* — Travis R Hunnings
(74) *Attorney, Agent, or Firm* — Sughrue Mion, PLLC (57) ABSTRACT

When a microcomputer detects that a user asks a question about a way of operating an air-conditioner, the microcomputer illuminates a switch of the air-conditioner, and moves a pointer displayed in an area being illuminated in an operation direction of the switch.

8 Claims, 6 Drawing Sheets

VEHICULAR LIGHTING DEVICE

CROSS REFERENCE TO RELATED APPLICATIONS

This application is on the basis of Japanese Patent Application No. 2017-147412, the contents of which are hereby incorporated by reference.

BACKGROUND

Technical Field

The present invention relates to a vehicular lighting device.

Related Art

Conventionally, a device described in Japan Patent Application Publication No. 2010-285061 (hereinafter, "JP'061") has been proposed as the above-stated vehicular lighting device. A lighting device for an interior of a vehicle described in JP'061 switches from one light source to another among a plurality of light sources, to sequentially illuminate a plurality of operation members in a vehicle.

SUMMARY

However, the above-stated conventional lighting device for an interior of a vehicle merely illuminates an operation member, thus it has a drawback that it is deficient incapability of producing hospitality for a driver or affinity for a vehicle.

The present invention has been devised in view of the above-described background, and it is an object of the present invention to provide a vehicular lighting device which can produce hospitality for a driver and affinity for a vehicle at a low cost.

A vehicular lighting device according to one aspect of the present invention includes: a lighting unit mounted on a vehicle and being configured to display a mark in an illumination area; a detection unit configured to detect a predetermined state of the vehicle or a user; and a controller configured to cause the lighting unit to start illuminating, and move the mark displayed in the illumination area, in accordance with particulars of detection performed by the detection unit.

The lighting unit may illuminate an area on an operation member in the vehicle, and the controller may move the mark in a direction in which the operation member is operated.

The operation member may be provided at an instrument panel.

The vehicular lighting device may further include a driving unit configured to drive the lighting unit, to move the illumination area, wherein the operation member may include a plurality of operation members provided in a rear seat or an elevating lift, and the controller may control the driving unit, to move the illumination area of the lighting unit so that the illumination area sequentially goes across the plurality of operation members.

The lighting unit may illuminate an area on a steering wheel, the detection unit may detect a curve in front of the vehicle during driving, and the controller may move the mark in accordance with a steering angle and a steering direction for going around the detected curve.

The lighting unit may illuminate an area on a steering wheel, the detection unit may detect that the vehicle is changed from a stopping state to a starting state when the steering wheel is not in a neutral position, and the controller may move the mark in accordance with a steering angle and a steering direction for returning the steering wheel to the neutral position.

The detection unit may detect a state in which the user asks a question, and when an answer to the question includes a direction, the controller may move the mark in the direction.

As described above, according to the present invention, by moving a mark displayed within a range in which an image is projected, it is possible to provide a vehicular lighting device which can produce hospitality for a driver and affinity for a vehicle at a low cost.

DETAILED DESCRIPTION (First embodiment)

Figure 1:
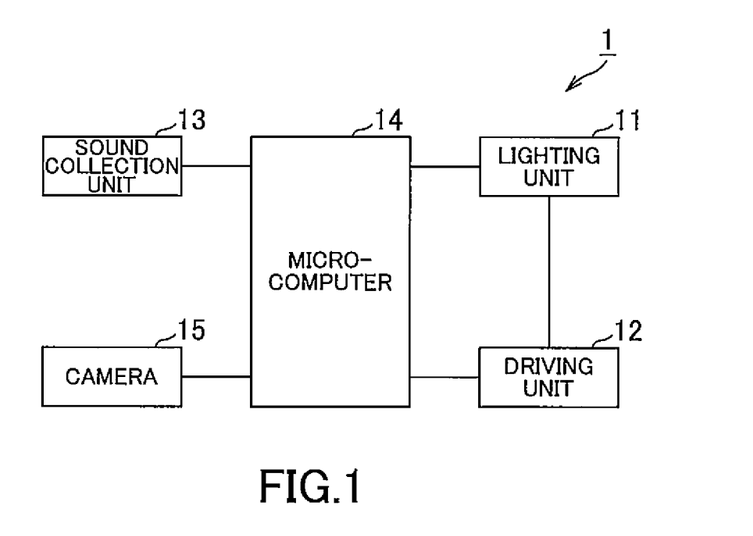
FIG. 1 is a block diagram showing a vehicular lighting device according to the present invention in a first embodiment.

Hereinafter, a first embodiment of the present invention will be described with reference to FIG. 1. FIG. 1 is a block diagram showing a vehicular lighting device according to the present invention in the first embodiment. A vehicular lighting device 1 includes a lighting unit 11, a driving unit 12, a sound collection unit 13 serving as a detection unit, a microcomputer 14 serving as a controller, and a camera 15.

Figure 3:
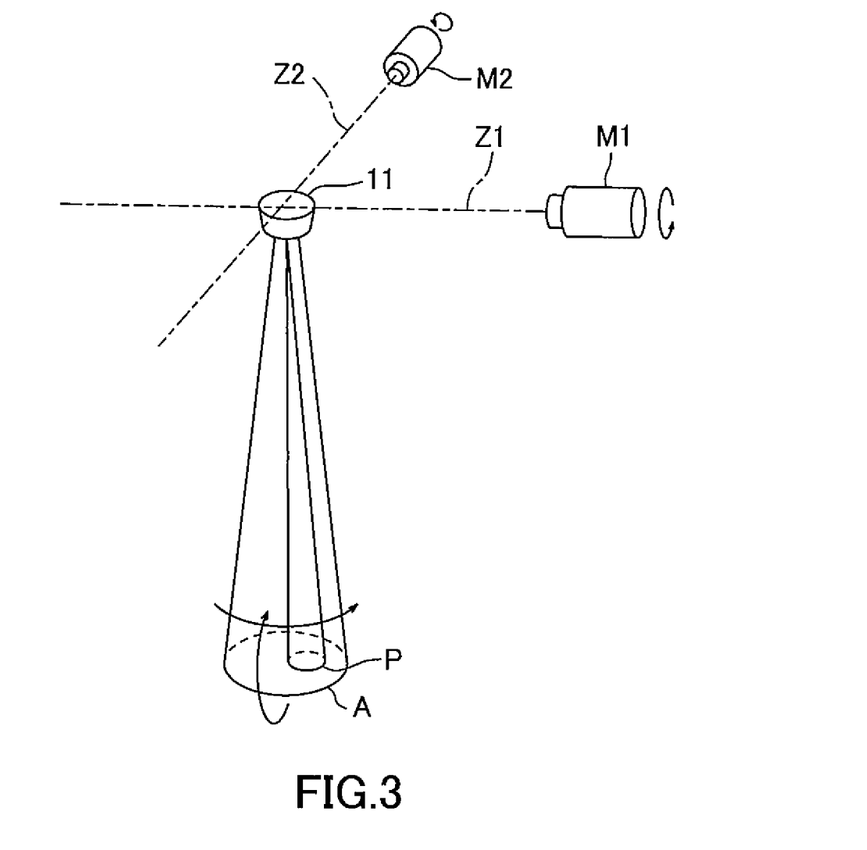
FIG. 3 shows details of the lighting unit and a driving unit shown in FIG. 1.

The lighting unit 11 includes two light sources (both are not shown) including a light source which illuminates a circular illumination area A, for example, and a light source which displays a pointer P in the illumination area A, as shown in FIG. 3. The lighting unit 11 is rotatably supported at a ceiling of a vehicle, for example.

The driving unit 12 includes a first rotation motor M1 which rotates the lighting unit 11 about a first rotation axis Z1, and a second rotation motor M2 which rotates the lighting unit 11 about a second rotation axis Z2 crossing the first rotation axis Z1, as shown in FIG. 3. The first rotation axis Z1 and the second rotation axis Z2 cross an optical axis of the lighting unit 11. Accordingly, the driving unit 12 can move the lighting unit 11 for 360 degrees.

The sound collection unit 13 includes a known microphone and collects a user's speech (i.e., voice, talking).

The microcomputer 14 includes a CPU, a ROM, a RAM and the like, and has control over the entire vehicular lighting device 1. The microcomputer 14 is connected with the lighting unit 11 and controls the lighting unit 11. Also, the microcomputer 14 is connected with the sound collection unit 13, and speech information of a user which is collected by the sound collection unit 13 is input to the microcomputer 14. The camera 15 is disposed in a vehicle and is attached so as to obtain an image of an interior of a vehicle.

Figure 4:
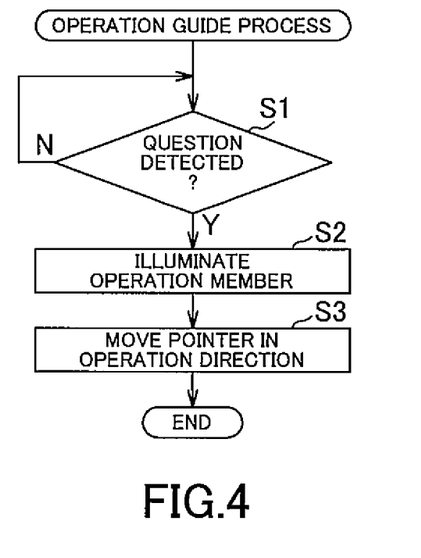
FIG. 4 is a flow chart showing an operation guide process of a microcomputer shown in FIG. 1.

Operations of the vehicular lighting device 1 having the above-described configuration will be described below with reference to FIG. 4. When the microcomputer 14 detects a state in which a user asks a question about a way of operating a certain operation member, by analyzing speech information provided from the sound collection unit 13 (step S1), the microcomputer 14 projects an image onto the certain operation member and starts illuminating the certain operation member (step S2). More specifically, with the lighting unit 11 being put off, the microcomputer 14 controls the driving unit 12 to move the lighting unit 11 to a position where the lighting unit 11 can illuminate the operation member. Subsequently, the microcomputer 14 puts on the lighting unit 11 to start illuminating the operation member. Thereafter, the microcomputer 14 moves the pointer P displayed in the illumination area A in an operation direction of the operation member being illuminated (step S3), and a process is returned back to the step S1.

Figure 5:
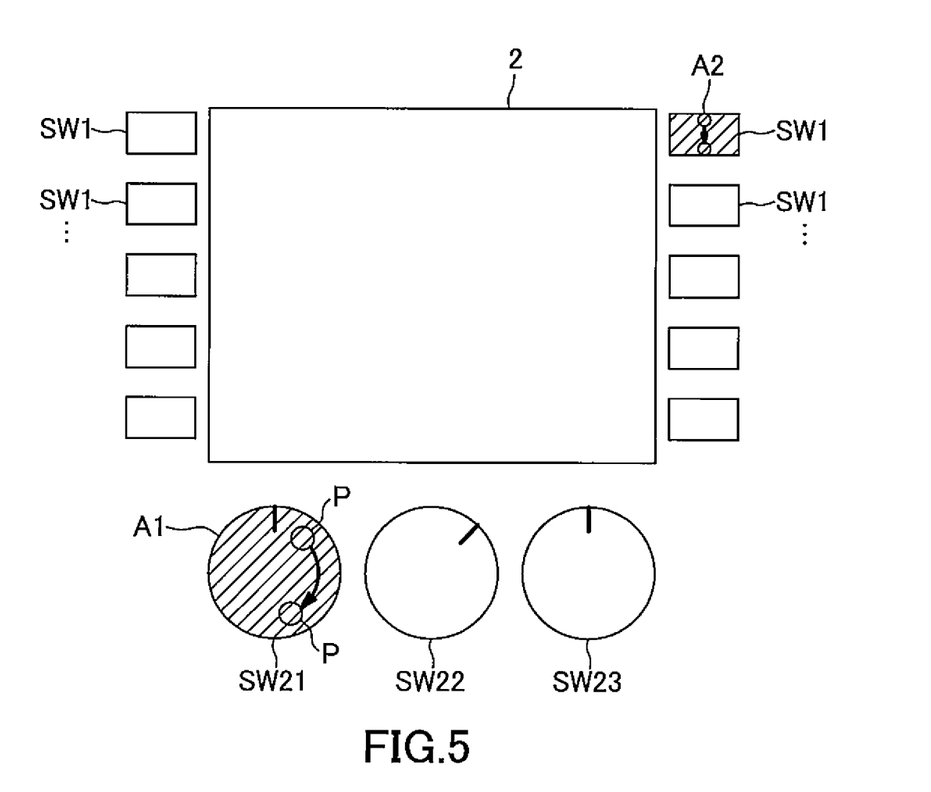
FIG. 5 is a front view of an instrument panel to be illuminated by the vehicular lighting device shown in FIG. 1 according to the first embodiment.

Next, a specific example of the above-described vehicular lighting device 1 will be described with reference to FIG. 5. FIG. 5 is a front view of an instrument panel of a vehicle which is to be illuminated by the vehicular lighting device 1 shown in FIG. 1. As shown in FIG. 5, a liquid crystal display (LCD) 2 is provided at a center of the instrument panel, and various kinds of switches SW1 (operation members) of push-button type, for example, are provided on right and left sides of the LCD 2. Also, below the LCD 2, switches SW21, SW22, and SW23 (operation members) of dialing type, for example, for adjusting an air conditioner are provided. The switch SW21 is a switch for adjusting a temperature of an air conditioner. The switch SW22 is a switch for adjusting a volume of air of an air conditioner. The switch SW23 is a selector switch for an air distribution outlet of an air conditioner.

Consider an instance in which a user asks a question, "how can a temperature of an air conditioner be raised?", for example. When this question is input to the microcomputer 14 through the sound collection unit 13, the microcomputer 14 detects the question about an operating way for raising a temperature of an air conditioner, and illuminates an illumination area A1 shown by the hatching on the switch SW21. Preferably, the illumination area A1 is set so as not to include the other switch SW22 in the neighborhood. In the present embodiment, the illumination area A1 has the same area as a front side of the switch SW21.

Subsequently, the microcomputer 14 displays the pointer P in the illumination area A1, and moves the pointer P in an operation direction. Specifically, if an operation for raising a temperature of an air conditioner is an operation of turning the switch SW21 clockwise, for example, the microcomputer 14 moves and turns the pointer P clockwise.

Consider an instance in which a user asks a question, "how can a destination be set in a navigation system?", for example. When this question is input to the microcomputer 14 through the sound collection unit 13, the microcomputer 14 detects the question about an operating way for setting a destination, and illuminates an illumination area A2 shown by the hatching on the switch SW1 (the uppermost switch on the right side in the present embodiment) for setting a destination. Preferably, the illumination area A2 is set so as not to include the other switch SW1 in the neighborhood. In the present embodiment, the illumination area A2 has the same area as a front side of the switch SW1.

Subsequently, the microcomputer 14 displays the pointer P in the illumination area A2, and moves the pointer P in an operation direction. Specifically, the microcomputer 14 moves the pointer P back and forth to inform that the switch SW1 should be pressed down.

According to the above-described first embodiment, when the microcomputer 14 detects a question about an operating way, the microcomputer 14 illuminates an operation member and moves the pointer P displayed in the illumination area A1 or A2 in an operation direction. As a result, a user can easily grasp intuitively what part and how he should operate. Consequently, hospitality for a driver and affinity for a vehicle can be produced.

It is noted that in the above-described first embodiment, though the lighting unit 11 is caused to start illuminating in response to a question about an operating way, the present invention is not limited to that. For example, the lighting unit 11 may be caused to start illuminating in response to a question about a direction, such as "in what direction is an ambulance?" or "in what direction is an approaching car?". When the microcomputer 14 detects a question about a direction, the microcomputer 14 controls the lighting unit 11 and the driving unit 12, to start illuminating an illumination area A3 (a predetermined position, refer to FIG. 2) on an instrument panel, for example. The illumination area A3 is an area within sight of a user who is seated on a seat of a vehicle. The microcomputer 14 detects an area within sight of a current user from an image of a user's face obtained by the camera 15, and sets the illumination area A3 in the detected area within sight of a current user. Of course, a position of the illumination area A3 may be determined previously.

Figure 2:
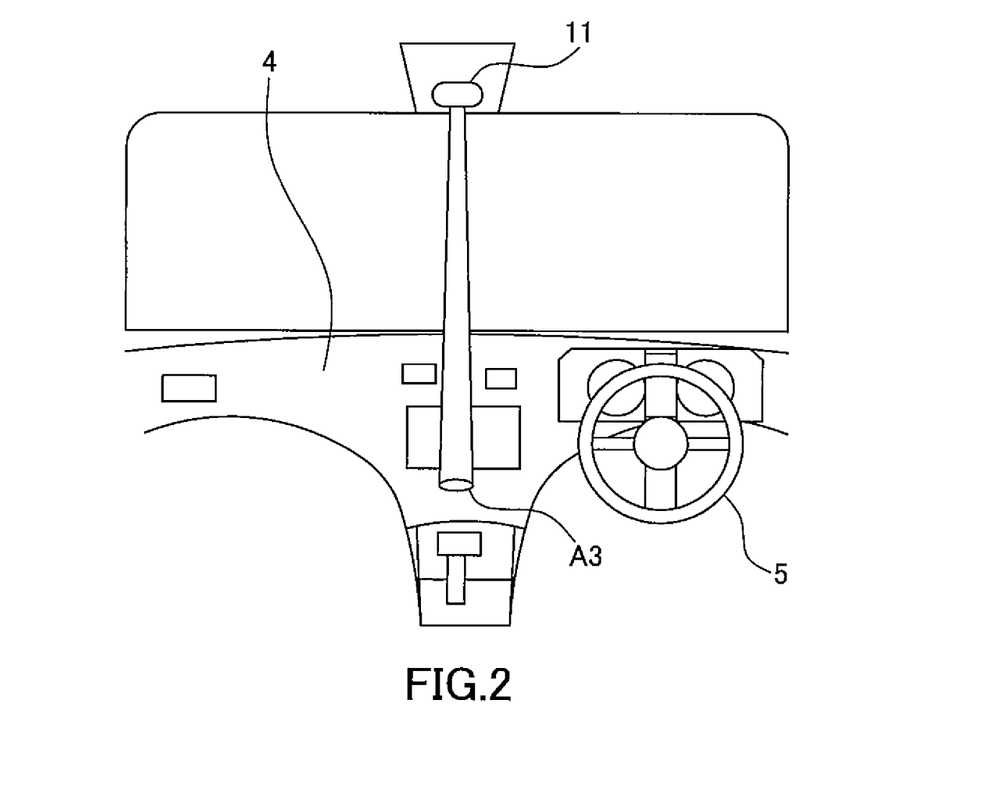
FIG. 2 is an explanatory view for explaining a position where a lighting unit in FIG. 1 is attached.

Thereafter, the microcomputer 14 controls the driving unit 12, to move the pointer P displayed in the illumination area A3 in a direction corresponding to an answer to a question. For example, in a case where there is a question, "in what direction is an ambulance?" or "in what direction is an approaching vehicle?" and an ambulance or an approaching car is found on the right of a vehicle as a result of analysis of an image obtained by a camera not shown, the microcomputer 14 moves the pointer P rightward. It is noted that, in indicating a direction of an ambulance, illustration of an ambulance may be displayed as the illumination area A3, within which the pointer P is moved.

Also, though two light sources of a light source which illuminates the illumination areas A1, A2, and A3 and a light source which displays the pointer P, for example, are used as the lighting unit 11 in the first embodiment, the present invention is not limited to that. The lighting unit 11 may include a projection-type display device such as a projector which is configured to project an image.

(Second embodiment)

Figure 6:
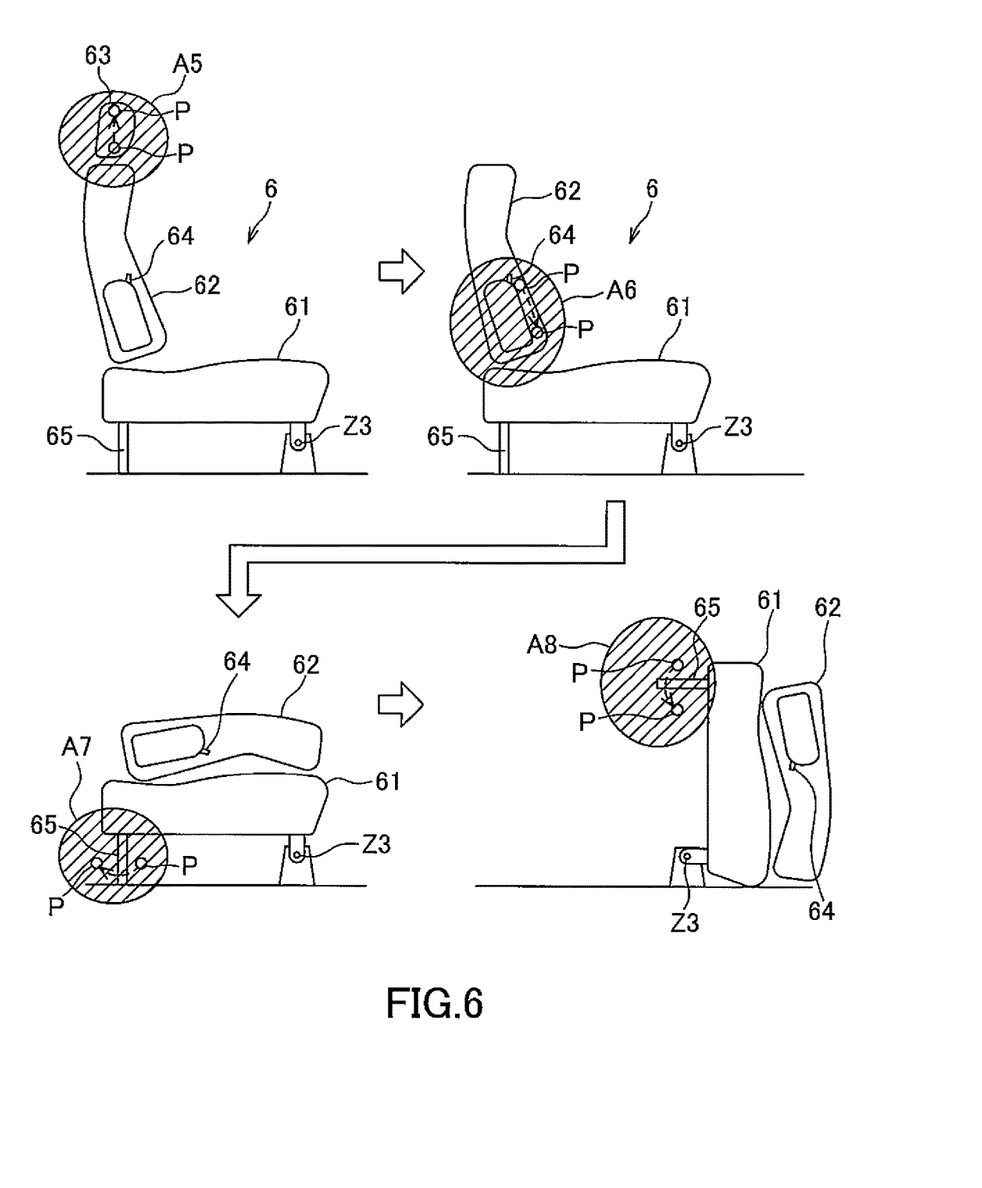
FIG. 6 is an explanatory view for explaining operations of the vehicular lighting device shown in FIG. 1 according to a second embodiment.

Next, a second embodiment of the present invention will be described with reference to FIG. 6. A configuration of a vehicular lighting device 1 according to the second embodiment is similar to that of the vehicular lighting device 1 shown in FIG. 1 according to the first embodiment, and so, detailed description thereof will be omitted. In the second embodiment, when the microcomputer 14 detects that a user asks a question requesting instructions for folding a rear seat by analyzing speech information of a user, the microcomputer 14 starts illuminating a rear seat.

Figure 8:
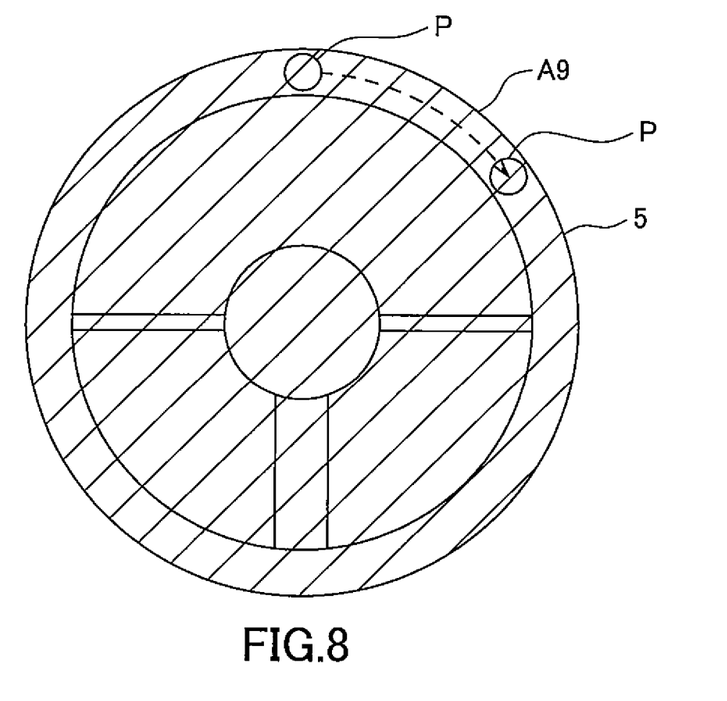
FIG. 8 is an explanatory view for explaining operations of the vehicular lighting device shown in FIG. 7 according to the third embodiment.

Operations of the vehicular lighting device 1 roughly described above according to the second embodiment will be described with reference to FIG. 8. A rear seat 6 includes a seat unit 61, a back rest 62, and a pillow 63. First, the microcomputer 14 controls the lighting unit 11 and the driving unit 12, to illuminate an illumination area A5 on the pillow 63 (operation member). More specifically, the microcomputer 14 drives the lighting unit 11 so that the illumination area A5 is located on the pillow 63 with the lighting unit 11 being put off.

Subsequently, the microcomputer 14 puts on the lighting unit 11, to start illuminating the pillow 63. Thereafter, the microcomputer 14 moves the pointer P displayed in the illumination area A5 in an upward direction which is a direction in which the pillow 63 is to be detached. As a result, a user understands that he should detach the pillow 63 first.

After the illumination area A5 is illuminated for a predetermined time, the microcomputer 14 controls the driving unit 12, to move the lighting unit 11 so that an illumination area A6 is located on the operation levers 64 (operation members) provided on right and left sides of the back rest 62 with the lighting unit 11 being put on. Subsequently, the microcomputer 14 moves the pointer P displayed in the illumination area A6 in a direction in which the operation levers 64 are to be operated.

After the illumination area A6 is illuminated for a predetermined time, the microcomputer 14 controls the driving unit 12, to move the lighting unit 11 so that an illumination area A7 is located on the rear leg 65 (operation member) provided below the seat unit 61 with the lighting unit 11 being put on. Subsequently, the microcomputer 14 moves the pointer P displayed in the illumination area A7 in a direction in which the seat unit 61 stands erect. As a result, a user understands that he should next raise the rear leg 65 and turn the seat unit 61 about an axis Z3 so that the seat unit 61 can stand erect.

After the illumination area A7 is illuminated for a predetermined time, the microcomputer 14 controls the driving unit 12, to move the lighting unit 11 so that an illumination area A8 is located on the rear leg 65 while the lighting unit 11 is kept being put on and the seat unit 61 is standing erect. Subsequently, the microcomputer 14 moves the pointer P displayed in the illumination area A8 in a direction in which the rear leg 65 is to be folded. As a result, a user understands that he should next fold the rear leg 65.

According to the above-described second embodiment, when the microcomputer 14 detects a question about a way of folding the rear seat 6, the microcomputer 14 sequentially illuminates operation members of the rear seat 6 and moves the pointer P displayed in the illumination area A5, A6, A7, or A8 in an operation direction. As a result, a user can easily grasp intuitively what part and how he should operate in order to fold the rear seat 6. Accordingly, hospitality for a driver and affinity for a vehicle can be produced.

It is noted that though a question requesting instructions for folding the rear seat 6 is detected using the sound collection unit 13 in the above-described second embodiment, the present invention is not limited to that. Detection may be performed through an operation of an operation member such as a switch.

Also, though the lighting unit 11 gives guidance on a way of folding the rear seat 6 in the above-described second embodiment, the present invention is not limited to that. The lighting unit 11 may give guidance on an operation of an elevating lift for the physically disabled. A procedure for placing a wheelchair on a vehicle with the use of an elevating lift is as follows, for example. First, an elevating lift is lowered through an operation of a remote controller, and a wheelchair is placed on the elevating lift. Subsequently, the wheelchair is fixed using a stopper or a seatbelt provided in the elevating lift, and the elevating lift is raised through an operation of the remote controller, so that the wheelchair is placed on the vehicle. Then, the lighting unit 11 may be designed so as to sequentially illuminate the remote controller, the stopper, the seatbelt, and the like, to give guidance on an operation of the elevating lift.

(Third embodiment)

Figure 7:
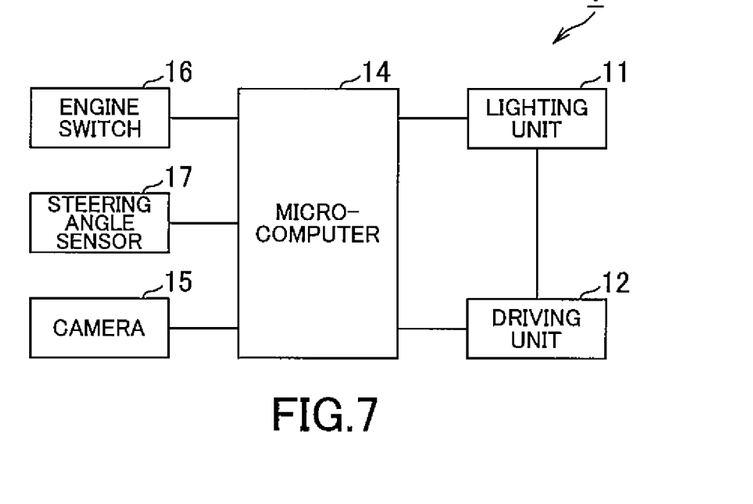
FIG. 7 is a block diagram showing a vehicular lighting device according to the present invention in a third embodiment.
Figure 9:
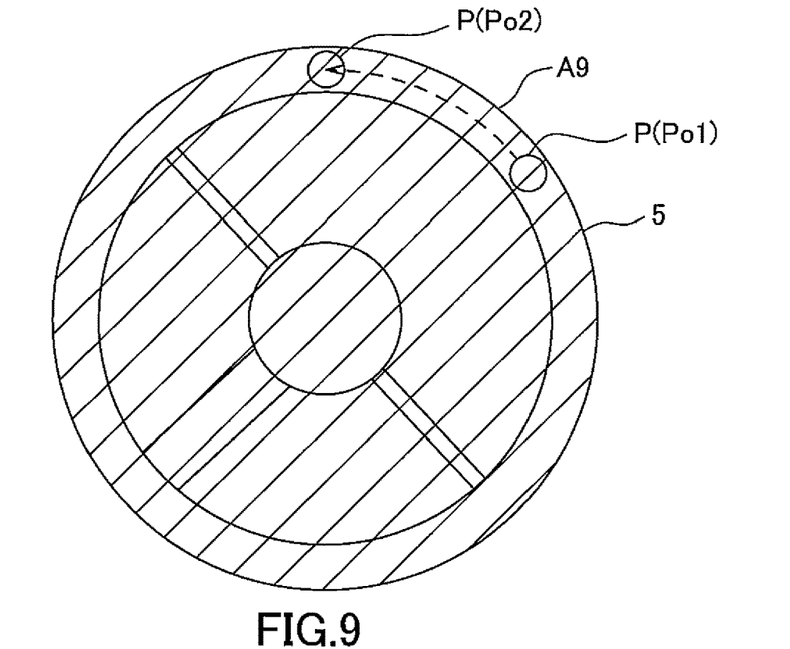
FIG. 9 is an explanatory view for explaining operations of the vehicular lighting device shown in FIG. 7 according to the third embodiment.

Next, a third embodiment of the present invention will be described with reference to FIGS. 7 to 9. FIG. 7 is a block diagram showing a vehicular lighting device 1 according to the present invention in the third embodiment. It is noted that in FIG. 7, parts which have already been described in the above first embodiment with reference to FIG. 1 will be denoted by the same reference numerals, and detailed description thereof will be omitted.

A microcomputer 14 of the third embodiment illuminates a steering wheel 5 to give guidance on operations of the steering wheel 5. The vehicular lighting device 1 includes a lighting unit 11, a driving unit 12, and a camera 15 and an engine switch 16 which serve as detection units, and a steering angle sensor 17. The camera 15 is attached so as to obtain an image of an area in front of a vehicle, for example. The steering angle sensor 17 can detect a steering angle of a vehicle.

The microcomputer 14 analyzes an image of the camera 15 in the course of driving, to detect whether or not there is a curve in the front. When it is detected that there is a curve, the microcomputer 14 obtains a steering angle and an operation direction of the steering wheel 5 for going around the detected curve. Subsequently, the microcomputer 14 illuminates an illumination area A9 shown by the hatching on the steering wheel 5, as shown in FIG. 8, so that the steering wheel 5 starts being illuminated.

Thereafter, the microcomputer 14 displays the pointer P on the uppermost portion of the steering wheel 5 in the illumination area A9. Subsequently, the microcomputer 14 moves the pointer P toward a position related to the obtained steering angle and the obtained operation direction of the steering wheel 5. A track of movement at that time takes a shape of a partial circle along the steering wheel 5. As a result, a user can intuitively grasp to what degree he should turn the steering wheel 5 while driving without being disturbed.

Also, when the engine switch 16 is turned on, the microcomputer 14 detects that a vehicle is changed from a stopping state to a starting state. Subsequently, the microcomputer 14 reads a result of detection of the steering angle sensor 17, and detects whether or not the steering wheel 5 is in a neutral position. Additionally, if the steering wheel 5 is not in a neutral position, the microcomputer 14 detects a steering-without-driving state, and then illuminates the illumination area A9 shown by the hatching on the steering wheel 5, as shown in FIG. 9, so that the steering wheel 5 starts being illuminated. Subsequently, the microcomputer 14 moves the pointer P displayed in the illumination area A9 in accordance with a steering angle and an operation direction for returning the steering wheel 5 to a neutral position.

More specifically, the microcomputer 14 obtains the uppermost portion Po1 of the steering wheel 5 in a steering-without-driving state based on a steering angle of the steering wheel 5, and displays the pointer P to the obtained uppermost portion Po1. Subsequently, the microcomputer 14 moves the pointer P onto the uppermost portion Po2 of the steering wheel 5 in a neutral state. As a result, a user can intuitively grasp to what degree he should turn the steering wheel 5 in order to return the steering wheel 5 to a neutral position.

Also, according to a possible different embodiment, when the microcomputer 14 detects that a vehicle starts with a parking brake being pulled, the microcomputer 14 illuminates an area on a parking brake which is disposed between a driver's seat and a passenger seat or near a bottom of a driver's seat, and moves a pointer in the area being illuminated back and forth repeatedly.

(Fourth embodiment)

Figure 10:
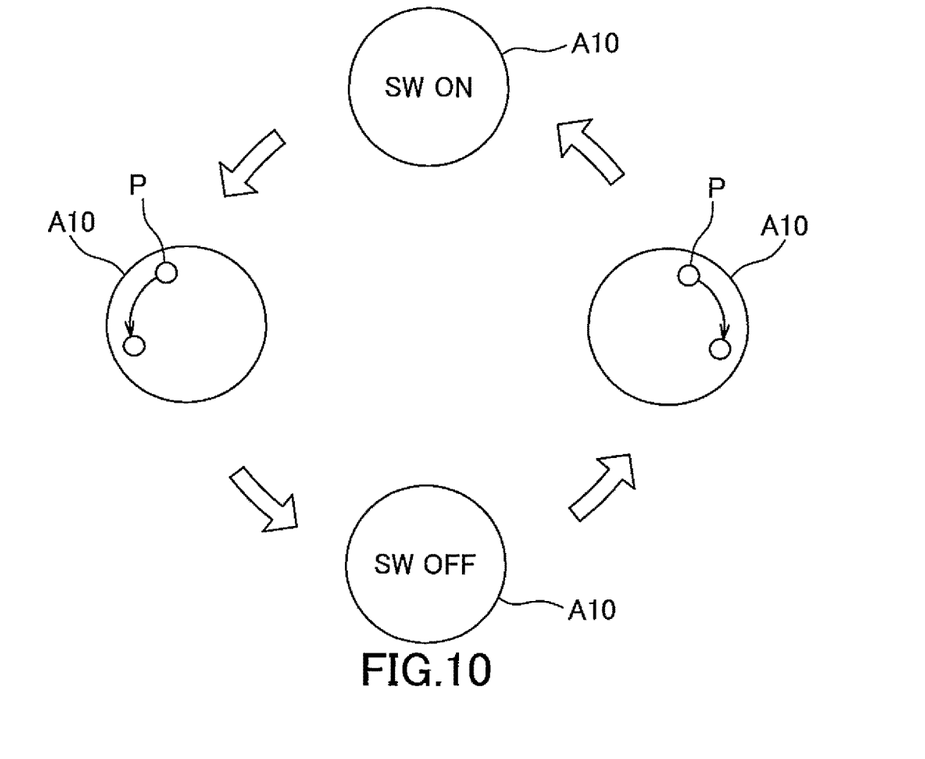
FIG. 10 is an explanatory view for explaining operations of the vehicular lighting device shown in FIG. 1 according to a fourth embodiment.

Next, a fourth embodiment of the present invention will be described. A configuration of a vehicular lighting device 1 according to the fourth embodiment is similar to that according to the first embodiment, and so, detailed description thereof will be omitted. When the microcomputer 14 detects that a user touches an operation switch with his hands, from an image obtained by a camera 15, for example, the microcomputer 14 illuminates an illumination area A10 within a user's sight. At that time, if an operation switch is in an off state, the microcomputer 14 displays characters "SWOFF" in the illumination area A10, as shown in FIG. 10. Subsequently, when a user performs an operation of turning an operation switch clockwise, for example, the microcomputer 14 displays a pointer P in the illumination area A10 and moves the pointer P clockwise.

When an operation switch is placed in an on state as a result of a user's operation, the microcomputer 14 displays characters "SWON" in the illumination area A10. Also, when a user performs an operation of turning an operation switch counter-clockwise, for example, the microcomputer 14 displays the pointer P in the illumination area A10 and turns the pointer P counter-clockwise. The illumination area A10 is displayed within a user's sight as described above, and so, a user can operate an operation switch without directly looking at an operation switch.

It is noted that an operation switch of the above-described fourth embodiment includes an operation switch displayed on a touch-panel navigation system or a display of a meter.

It is noted that though the pointer P has been described as one example of a mark in the above-described embodiments, the present invention is not limited to that. A mark includes an arrow, and an arrow displayed in an image may be moved. Alternatively, an arrow may be moved while being extended.

Also, though the lighting unit 11 is designed so as to be driven in the above-described embodiments, the present invention is not limited to that and includes a case in which a single object to be illuminated is illuminated using the lighting unit 11 being fixed.

Also, though a position of the pointer P is moved in the above-described embodiments, the present invention is not limited to that. Terms "move the mark" in claims mean not only that a position of the pointer P is moved, but also that the pointer P is moved through a change in a shape thereof. For example, when an alarm is issued, the microcomputer 14 controls the lighting unit 11, to illuminate an illumination area within a user's sight. The microcomputer 14 displays the pointer P in an illumination area and changes a shape or a size of the pointer P being displayed. As the pointer P, illustration which indicates particulars of an alarm may be used. Also, at that time, the pointer P may be caused to blink, or alternatively, an illumination area may be changed in a shape or a size thereof. As a result of this, it is possible to make a user aware of an alarm.

Also, the above-described vehicular lighting device 1 can be used also as a door-handle light operating at a time when a user gets into a vehicle. When the microcomputer 14 detects getting-on of a user, the microcomputer 14 may illuminate an illumination area around a user's feet outside a vehicle, for example, display a pointer or characters as a mark in the illumination area, and move the pointer or the characters. As characters, "BEWARE OF MUD" or "WELCOME" can be conceived, for example, and further, those characters may be positionally moved or moved by scaling-up/down, for example. In this manner, to move a pointer or characters could draw a user's attention.

Also, the above-described vehicular lighting device 1 can be used also for warning a user that he does not wear a seatbelt. When the microcomputer 14 detects that a user does not wear a seatbelt though he is seated, the microcomputer 14 illuminates an area within a user's sight and displays a pointer or characters in the area being illuminated. Then, the microcomputer 14 may inform a user that he does not wear a seatbelt by moving the displayed pointer or characters.

It is noted that the present invention is not limited to the above-described embodiments. That is, various modifications can be made to carry out the present invention without departing from the essence of the present invention.

REFERENCE SIGNS LIST 1 vehicular lighting device
11 lighting unit
13 sound collection unit (detection unit)
14 microcomputer (controller)
15 camera (detection unit)
16 engine switch (detection unit)
63 pillow (operation member)
64 operation lever (operation member)
65 rear leg (operation member)
SW1 switch (operation member)
SW21, SW22, SW23 switch (operation member)
P pointer (mark)

What is claimed is:

1. A vehicular lighting device comprising:
　a lighting unit mounted on a vehicle and being configured to illuminate an illumination area and display a mark in the illumination area being illuminated;
　a detection unit configured to detect a predetermined state of the vehicle or a user; and
　a controller configured to cause the lighting unit to start illuminating the illumination area, and move the mark displayed in the illumination area, within the illumination area being illuminated, in accordance with contents of the detection performed by the detection unit.

2. The vehicular lighting device according to claim 1, wherein
　the lighting unit illuminates an area on an operation member in the vehicle, as the illumination area, and
　the controller moves the mark in accordance with an operation direction of the operation member.

3. The vehicular lighting device according to claim 2, wherein the operation member is provided on an instrument panel.

4. The vehicular lighting device according to claim 2, further comprising a driving unit configured to drive the lighting unit to move the illumination area, wherein the operation member includes a plurality of operation members provided in a rear seat or an elevating lift, and the controller controls the driving unit to move the illumination area of the lighting unit so that the illumination area sequentially goes across the plurality of operation members.

5. The vehicular lighting device according to claim 1, wherein the lighting unit illuminates an area on a steering wheel, as the illumination area, the detection unit detects a curve in front of the vehicle during driving, and the controller moves the mark in accordance with a steering angle and a steering direction for going around the detected curve.

6. The vehicular lighting device according to claim 1, wherein the lighting unit illuminates an area on a steering wheel, as the illumination area, the detection unit detects that the vehicle is changed from a stopping state to a starting state when the steering wheel is not in a neutral position, and the controller moves the mark in accordance with a steering angle and a steering direction for returning the steering wheel to the neutral position.

7. The vehicular lighting device according to claim 1, wherein the detection unit detects a state in which the user asks a question, and when an answer to the question includes a direction, the controller moves the mark in said direction.

8. The vehicular lighting device according to claim 1, wherein the lighting unit is configured to display the mark completely within the illumination area.

* * * * *